United States Patent [19]

Grot

[11] Patent Number: 4,591,439
[45] Date of Patent: May 27, 1986

[54] ION EXCHANGE PROCESS AND APPARATUS

[75] Inventor: Walther G. Grot, Chadds Ford, Pa.

[73] Assignee: E. I. Du Pont de Nemours and Company, Wilmington, Del.

[21] Appl. No.: 765,121

[22] Filed: Aug. 13, 1985

Related U.S. Application Data

[63] Continuation-in-part of Ser. No. 608,649, May 8, 1984, abandoned.

[51] Int. Cl.$^4$ .................. B01J 39/04; B01J 47/12
[52] U.S. Cl. .................. 210/638; 210/670; 210/269; 210/321.1
[58] Field of Search ......... 210/638, 670, 681, 266, 210/269, 286, 321.1; 521/26–29

[56] References Cited

U.S. PATENT DOCUMENTS

| | | | |
|---|---|---|---|
| 3,041,317 | 6/1962 | Gibbs et al. | 260/79.3 |
| 3,282,875 | 11/1966 | Connolly et al. | 260/29.6 |
| 3,454,490 | 7/1969 | Wallace | 210/22 |
| 3,506,635 | 4/1970 | Anderson | 260/88.3 |
| 3,560,568 | 2/1971 | Resnick | 260/513 |
| 3,718,627 | 2/1973 | Grot | 260/79.3 |
| 3,852,326 | 12/1974 | Nottke | 260/465.6 |
| 4,045,352 | 8/1977 | Rembaum et al. | 521/29 |
| 4,116,888 | 9/1978 | Ukihashi et al. | 521/31 |
| 4,131,740 | 12/1978 | England | 560/180 |
| 4,165,273 | 8/1979 | Azarov et al. | 204/301 |
| 4,500,430 | 2/1985 | Dasgupta | 210/638 |

FOREIGN PATENT DOCUMENTS 54-81663 6/1979 Japan .
1145445 3/1969 United Kingdom .

*Primary Examiner*—Ivars Cintins

[57] ABSTRACT

A device and process are disclosed for continuously removing cations from an aqueous solution by means of two compartment ion exchanger wherein one compartment cation exchange membrane material serves to separate the compartments and particulate cation exchange material serves as a cation absorber in the compartment opposite the cations to be removed.

5 Claims, 1 Drawing Figure

U.S. Patent May 27, 1986 4,591,439
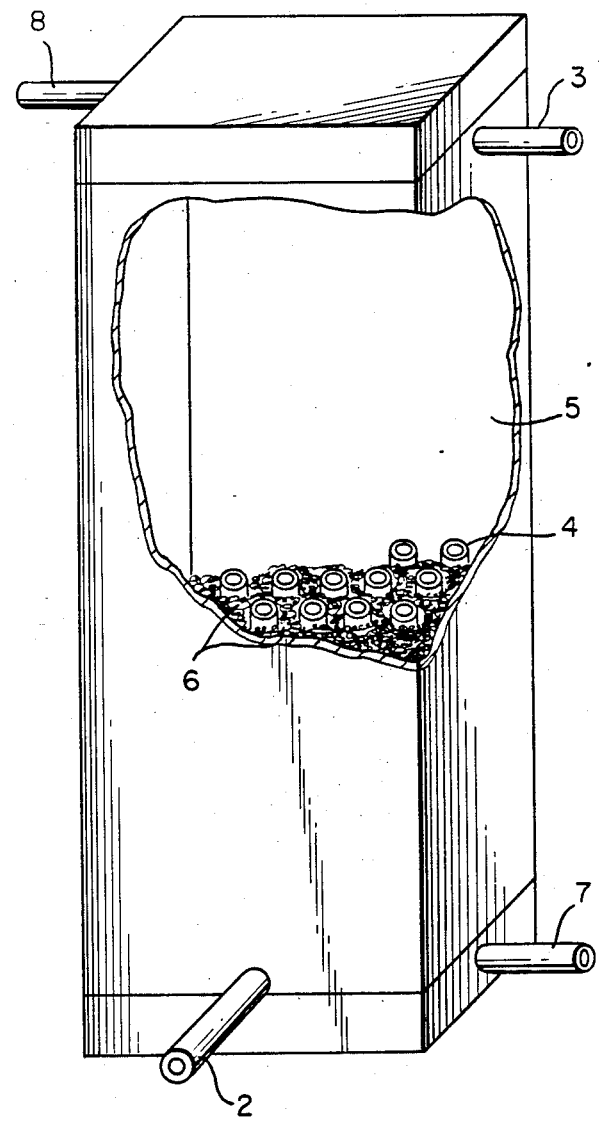

ION EXCHANGE PROCESS AND APPARATUS

This application is a continuation-in-part, of application Ser. No. 608,649 filed May 8, 1984, now abandoned.

BACKGROUND OF THE INVENTION

Ion exchange devices are used in a wide variety of domestic and industrial applications to remove cations dissolved in an aqueous stream. Many different cations can be removed by this technique, including, for example, nickel, copper, cobalt, silver, calcium and magnesium ions.

A difficulty encountered in the past in the use of cation exchange resins was the need for periodically removing the cation exchange device from operation to regenerate the cation exchange resin. Typically, the cation exchange resin would be regenerated by removal of the ions through a salt or acid wash or by passing an electric current through the cation exchange resin to aid in the removal of the ions.

SUMMARY OF THE INVENTION

This invention provides an improved nonelectrolytic cation exchange process and apparatus that continuously regenerates the ion exchange resin during the use of the ion exchange apparatus.

Specifically, the instant invention provides a nonelectrolytic cation exchange device having at least two compartments separated by a cation exchange membrane, a first compartment substantially filled with a particulate cation exchange resin and a second compartment with substantially no particulate cation exchange resin, means for continuously passing a cation-containing solution into and through the first compartment and means for continuously passing a regenerant solution into and through the second compartment.

The present invention further provides a process for continuously removing cations from an aqueous solution by continuously passing an aqueous cation-containing solution into and through a novel electrolytic cation exchange device having at least two compartments separated by cation exchange membrane, a first compartment being substantially filled with a particulate cation exchange resin and a second compartment having substantially no particulate cation exchange resin, the aqueous solution being continuously passed into and through the first compartment, and a regenerant solution into the being continuously passed through the second compartment.

BRIEF DESCRIPTION OF THE DRAWING

The Figure is a schematic cross-sectional representation of an ion exchange apparatus of the present invention.

DETAILED DESCRIPTION OF THE INVENTION

While a wide variety of apparatus configurations can be used in accordance with the present invention, a typical apparatus is schematically illustrated in partial-section in the Figure. The embodiment there illustrated is of the typical tube and shell configuration. In that device, exterior shell 1 is provided with inlet 2 and outlet 3 for the passage of an aqueous cation solution to be purified. The interior space of the cation exchange device is divided into two compartments by membranes, for example, in the form of tubes 4, which are prepared from a cation exchange resin. Interstitial compartment 5, the space between the tubes, is substantially filled with particulate cation exchange resin 6. In operation, the aqueous cation solution is passed into inlet 2, through resin 6 in compartment 5 and out outlet 3; and a regenerant solution is passed into regenerant inlet 7, through the compartment defined by tubes 4, and out regenerant outlet 8, thereby continuously removing cations from the ion exchange resin. Of course, countercurrent flow through the device is also possible and, in fact, preferred. In such countercurrent flow, the cation solution and the regenerant solution enter the device at opposite ends, flow past each other, and exit the device at opposite ends.

The particular cation exchange membrane used as compartment separator in the present invention can vary considerably, depending on the chemical nature of the solute in the solution and the particular cations to be removed from the solution. Perfluorinated polymers having sulfonyl functional groups have been found to be particularly satisfactory. Such polymers can have a fluorinated hydrocarbon backbone chain to which are attached functional groups or pendant side chains bearing functional groups. The pendant side chains can contain, for example,

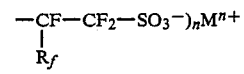

groups wherein $R_f$ is Cl, $CF_2Cl$ or a $C_1$ to $C_{10}$ perfluoroalkyl radical, or preferably, F and M is $H^+$ or a metal cation of valence n. Fluorinated polymers of this type and preparation of such polymers are described in detail in U.S. Pat. Nos. 3,282,875, 3,560,568, 3,718,627, and 3,041,317, all of which are hereby incorporated by reference.

Other perhalogenated copolymers, such as those having carboxylic functional groups, can be used as ion exchange membranes in the present invention. Such polymers have a perhalogenated, and preferably perfluorinated hydrocarbon backbone chain to which are attached the functional groups or pendant side chains which carry the functional groups. The pendant side chains can contain, for example,

groups wherein Z is $-CF_3$, $-CF_2Cl$, or, preferably, F; t is 1 to 12 and preferably 1 to 3; and W is $-COOR$ or $-CN$, wherein R is alkyl of $C_1$ to $C_4$. Preferably, the functional group in the side chains of the polymer will be present in terminal

groups. Such fluorinated polymers containing carboxylic functional groups and their preparation are disclosed in British Pat. No. 1,145,445 and U.S. Pat. Nos. 3,506,635 and 4,116,888, all hereby incorporated by reference. Preferred monomers for use in the preparation of such polymers are disclosed in U.S. Pat. Nos. 4,131,740 and 3,852,326, also hereby incorporated by reference.

Such fluorinated polymers containing sulfonyl or carboxyl functional groups can be, and preferably are, present as copolymers with tetrafluoroethylene. Copolymers have been found to be particularly useful wherein the copolymer is up to about 70 weight percent tetrafluoroethylene.

A wide variety of cation exchange resins can be used in the present invention, including, for example, those sulfonate resins commercially available from The Dow Chemical Company, Midland, MI, U.S.A. and supplied as Dowex 50 and Dowex CCR-1, from Diamond Shamrock Corporation, Cleveland, OH, U.S.A. and supplied as Duolite C-20 and CC-3, and from Rohm & Haas Company, Philadelphia, PA, U.S.A. and supplied as Amberlite 112 120-124. Sulfonated fluoropolymer derivatives and sulfonated crosslinked polystyrene ion exchange resins are preferred, such as those commercially available from Fischer Scientific Company, as "Rexyn 101". Of course, cation exchange resins having other functional groups, such as carboxyl groups, can also be used in practice of this invention.

The cation exchange resin should be particulate in nature; and the particles should have a substantially uniform size of about 0.01 to 5 millimeters and preferably about 0.5 to 2 millimeters in diameter.

The regenerant solution used in the present invention can be varied with the particular ion exchange membrane, ion exchange resin and ions to be removed. Typically, acids have been used to exchange with the cations from the ion exchange resins. Of these, sulfuric, nitric, and hydrochloric acids have been found to be particularly satisfactory, of which sulfuric acid is especially preferred. Processes for regenerating cation exchange resins are well known.

The present invention provides excellent removal of cations from aqueous streams, and is particularly useful for removing nickel, copper, cobalt, silver, calcium and magnesium found in industrial streams such as those encountered in plating operations or salt solutions. The present device can be used continuously, in contrast to those devices previously known in this art which typically are operated in cycles alternating between exchange and regeneration. The present invention relating to a nonelectrolytic device and process also eliminates any need for complex electrode and cell arrangements and multiple ion exchange membranes necessary for those devices in which regeneration of ion exchange membranes is periodically carried out electrolytically.

The present invention is further illustrated by the following specific examples.

EXAMPLE 1 AND COMPARATIVE EXAMPLE A

A tube and shell type ion exchanger was constructed of a bundle of 150 tubes made from a blend of 75% perfluorocarbon polymer having sulfonyl exchange groups and an equivalent weight of 1100 and 25% copolymer of tetrafluoroethylene and hexafluoropropylene. The tubes had an outer diameter of about 2.8 millimeters (0.11 inch) and an 0.25 millimeter (0.01 inch) wall thickness. The length of the tube bundle was about 75 centimeters (30 inches), resulting in a total exchange area of approximately 9.3 square meters (10 square feet). The tubes represented the compartment separator for this device. The tube bundle was placed in an outer shell of about 5 centimeters (2 inches) inside diameter. The space between the individual tubes and between the tubes and the wall was filled with 500 gm "Rexyn 101" (Fischer Scientific), a sulfonated polystyrene ion exchange resin having 50 weight percent moisture content, a particle size of 0.3 to 1.2 millimeters, an ion exchange capacity of 4.6 meq/gram of dry resin, and a total ion exchange capacity of 1.15 equivalents.

A cation removal system was established with a 50 liter recirculating cation supply side connected to the shell (interstitial) compartment of the ion exchanger and a recirculating source of aqueous acid regenerant side connected to the tube compartment of the ion exchanger.

55 liters of a nickel sulfate solution containing about 100 ppm $Ni^{++}$ was pumped in one direction through the shell (interstitial) compartment at a rate of 7.5 liters per minute. At the same time, 3.6 liters of 1.1 normal sulfuric acid was pumped in the same direction through the tube compartment at a rate of 17 liters per minute.

The cation removal system was operated as though the cation supply side was a rinsing bath for a nickel plating process and, with that in mind, additional $NiSO_4.6H_2O$ was added to the nickel sulfate solution at a rate of 1.1 gm/minute as make up, which caused the nickel concentration to equilibrate, during operation, between 20 and 80 ppm. The cation removal system, made up as described above, was operated for 4 hours, during which time the dilute sulfuric acid of the tube compartment was replaced once with fresh 1.1 normal sulfuric acid. Samples of both streams were taken at 20 minute intervals and analyzed for nickel, indicating an average rate of nickel transport of 14 gm per hour.

In Comparative Example A, the above procedure was repeated, but without granular ion exchange resin in the shell compartment. Under conditions of operation identical with those of Example 1, a nickel transport rate of 9 gm per hour was observed.

EXAMPLE 2 AND COMPARATIVE EXAMPLE B

A single tube exchanger was constructed of a tube having a 2.3 millimeter (0.09 inch) inner diameter, a 2.8 millimeter (0.11 inch) outer diameter and made from the same material as was used in Example 1. The tube was installed inside a glass shell having an 8 millimeter inner diameter. The active length of the tube was 38 centimeters (15 inches) resulting in an exchange area of 30.7 square centimeters (0.033 square feet).

The empty space of the shell compartment was filled with the same kind of sulfonated polystyrene ion exchange resin as was used in Example 1. The estimated volume of the resin was 14 milliliters, corresponding to an exchange capacity of 27 meq or 780 mg of $Ni^{++}$ ions.

Nickel sulfate solution containing 11 ppm $Ni^{++}$ was pumped in one direction through the shell compartment at a rate of 90 milliliters per minute. During the day this solution was passed "once through" the exchanger and discarded; during the night, 20 liters of this solution (containing 220 mg $Ni^{++}$) was recirculated through the exchanger, resulting in an approximately 50% depletion of the nickel in that solution.

200 ml of 1.2 normal sulfuric acid was continuously recirculated in the opposite direction through the tube at a rate of 32 milliliters per minute. The $Ni^{++}$ content of this solution was determined at periodic time intervals and the incremental rate of nickel transport calculated. The results are summarized in the following table.

| Hours Elapsed | mode | Ni accum. in regenerant ppm | Ni accum. in regenerant mg | Incremental Ni mg | Incremental Removal Rate mg hr.-m² |
|---|---|---|---|---|---|
| 0 | | 0 | 0 | 0 | — |
| | once thru | | | 16 | 11.3 |
| 4 | | 80 | 16 | | |
| | once thru | | | 14 | 16.0 |
| 6.5 | | 150 | 30 | | |
| | recircul. | | | 117 | 21.2 |
| 22 | | 700 | 147 | | |
| | once thru | | | 28 | 19.8 |
| 26 | | 800 | 175 | | |

The experiment was continued with a fresh supply of 200 ml 1.2 N H₂SO₄ and the following results were obtained:

| Hours Elapsed | mode | Ni accum. in regenerant ppm | Ni accum. in regenerant mg | Incremental Ni mg | Incremental Removal Rate mg hr.-m² |
|---|---|---|---|---|---|
| 0 | | 0 | 0 | 0 | — |
| | once thru | | | 30.4 | 19.5 |
| 4.4 | | 152 | 30.4 | | |
| | recircul. | | | 125.6 | 20.8 |
| 21.5 | | 780 | 156 | | |
| | once thru | | | 52 | 22.6 |
| 28 | | 1040 | 208 | | |
| | recircul. | | | 112 | 19.8 |
| 44 | | 1600 | 320 | | |

The lower rate during the first 6.5 hours may be due to the gradual build up of nickel concentration in the resin phase. Full rates of about 20 mg/hr.m² were achieved after the nickel concentration had reached an equilibrium value.

In Comparative Example B, the resin phase was omitted. The same exchanger was used as was used for Example 2. Twenty liters of a nickel sulfate solution containing 11 ppm Ni++ was continuously recirculated in one direction through the shell compartment at a rate of 95 milliliters per minute. Two hundred milliliters of 1.2 normal sulfuric acid was continuously recirculated in the opposite direction through the tube compartment at a rate of 32 milliliters per minute. Periodic analyses evidenced that the full rate of nickel removal for Comparative Example B operation was reached in only a few hours and that the full rate was about 2.5 mg/hr. m₂. After 96 hours of continuous operation, only 88 milligrams of nickel were removed from the solution in Comparative Example B.

I claim:

1. A nonelectrolytic cation exchange device having at least two compartments separated by a cation exchange membrane, at least a first one of the compartments being substantially filled with a particulate cation exchange resin and at least a second one of the compartments being substantially free from particulate cation exchange resin, means for continuously passing an ion-containing solution into and through the first compartment and means for continuously passing a regenerant solution into and through the second compartment.

2. A cation exchange device of claim 1 wherein the cation exchange membrane is a sulfonated fluoropolymer derivative.

3. A cation exchange device of claim 1 wherein the cation exchange resin is a sulfonated crosslinked polystyrene.

4. A nonelectrolytic process for continuously removing cations from an aqueous solution by continuously passing an aqueous cation solution into and through a cation exchange device having at least two compartments separated by cation exchange membrane, at least a first one of the compartments being substantially filled with a granular cation exchange resin and at least a second one of the compartments being substantially free from particulate cation exchange resin, the aqueous solution being passed into and through the first compartment, and continuously passing a regenerant solution into and through the second compartment.

5. A process of claim 4 wherein the regenerant solution consists essentially of sulfuric acid.

* * * * *